United States Patent [19]

de Saint Martin

[11] Patent Number: 4,514,219
[45] Date of Patent: Apr. 30, 1985

[54] METHOD OF PRODUCING MOLTEN METAL

[75] Inventor: Lucien de Saint Martin, Metz, France

[73] Assignee: Institut de Recherches de la Siderurgie Française, Saint-Germain-en-Laye, France

[21] Appl. No.: 575,853

[22] Filed: Feb. 1, 1984

[30] Foreign Application Priority Data

Feb. 3, 1983 [FR] France ................................ 83 01841

[51] Int. Cl.³ ............................................. C22B 1/248
[52] U.S. Cl. .......................................... 75/43; 75/11; 75/44 S
[58] Field of Search ............................ 75/44 S, 43, 11

[56] References Cited

U.S. PATENT DOCUMENTS 2,805,930  9/1957  Udy ........................................ 75/11
3,163,520 12/1964  Collin ..................................... 75/11
3,224,871 12/1965  Collin ..................................... 75/11
3,837,791  9/1974  Schoch ................................ 75/44 S
4,010,935  3/1977  Stephens ............................ 75/44 S Primary Examiner—Peter D. Rosenberg
Attorney, Agent, or Firm—Karl F. Ross; Herbert Dubno

[57] ABSTRACT

A furnace for the melting of ferriferous materials, namely, iron scrap, pig iron and sponge iron having a low oxygen content, is operated by the addition of coke to the charge so that the quantity of coke substantially is equal to that required to carburize the melt. A non-oxidizing gas heated by plasma torch is introduced into the melt to smelt the charge by direct transfer of sensible heat thereto. The method allows the use of renewable energy sources in place of the fossil fuels and other nonrenewable sources hitherto required to generate the thermal energy for melting.

9 Claims, 1 Drawing Figure

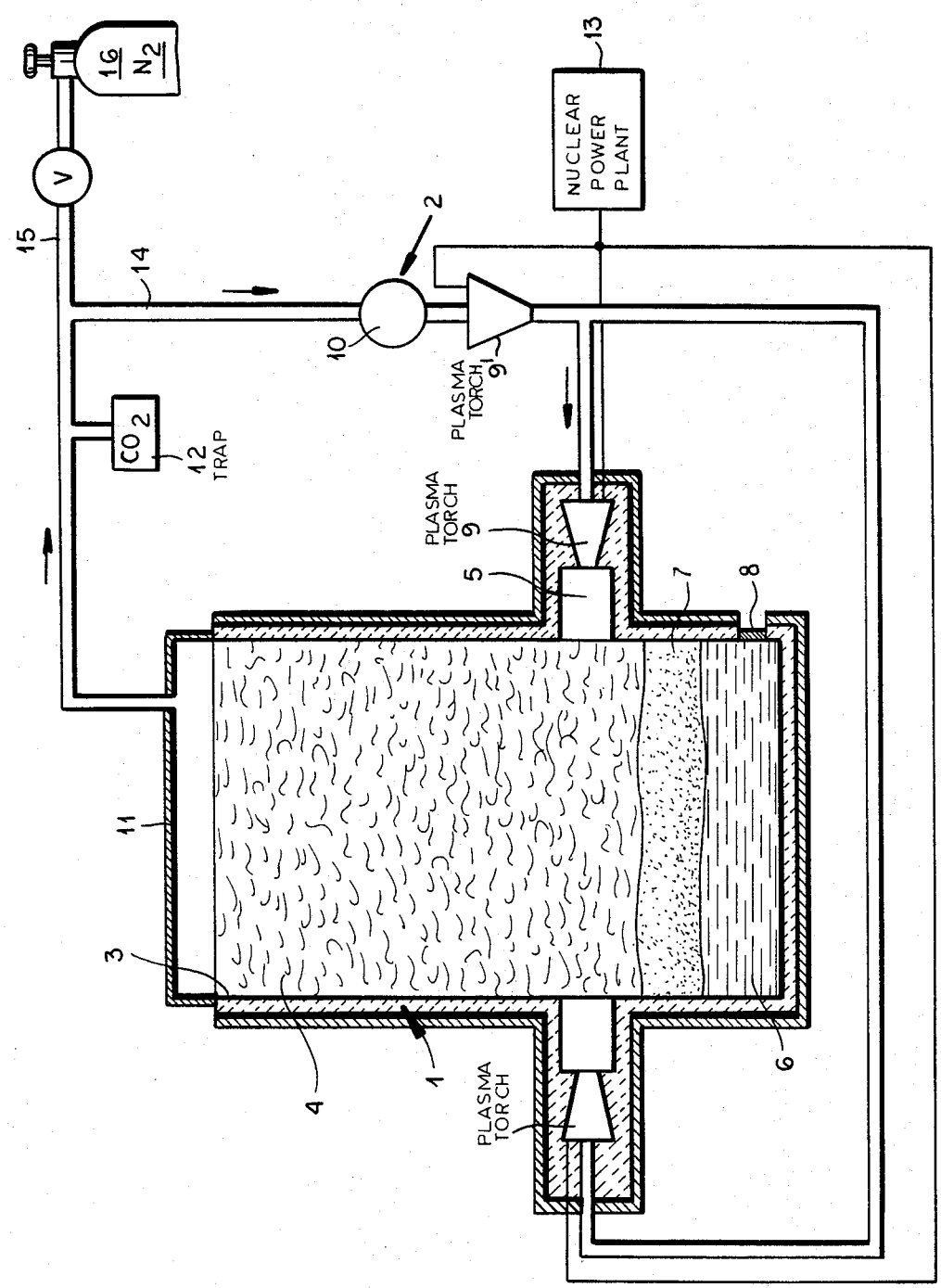

METHOD OF PRODUCING MOLTEN METAL

FIELD OF THE INVENTION

My present invention relates to a method of producing a metal melt and, more particularly, to the melting of solid ferrous materials, especially ferrous materials having a high concentration of iron in the formation of molten iron or an iron melt. The invention is most specifically applied to the melting or iron sponge and scrap iron, i.e. materials which have a low concentration of iron oxide.

BACKGROUND OF THE INVENTION

Among the various furnaces used to produce an iron melt or to melt ferriferous materials, it is known to provide a solid charge constituted by the ferriferous material and a predetermined quantity of carbonaceous material such as coke. The melt is formed at the bottom of this furnace and generally a gas rich in oxygen is caused to pass upwardly through the solid charge bed so that the reaction of the oxygen of the gas with the carbon of the charge in the exothermic production of carbon oxides, generates the heat necessary to melt the charge. It is customary to blow the charge by tuyeres or air or oxygen injectors disposed somewhat above the melt in the furnace and thus generally at a location between the point at which the charge is introduced into the furnace and the point at which the melt is tapped therefrom.

Typical of these furnaces are the cupola melting furnaces. The cupola charge is constituted generally on the one hand by the ferriferous solid materials having a high concentration of metallic iron such as scrap, solidified iron (pig iron) or sponge iron produced in direct reduction furnaces from iron ore. Another part of the charge is generally coke which provides the carbonaceous material and also is present to assure the permeability of the charge to the oxygen containing gases which are injected by the tuyeres.

The quantity of coke which is used must be sufficient not only to ensure the carburization of the iron, i.e. the formation of an iron melt containing a predetermined concentration of carbon, but also to combine with the oxygen for producing the thermal energy required to melt the iron.

In some cases it is necessary to generate the thermal energy by introducing through the tuyeres auxiliary combustible materials such as natural gas or liquid fuels.

While such systems are highly versatile in that they allow selection among the various energy sources or fuels and permit coke or hydrocarbon sources to be selected or utilized interchangeably, the versatility is nevertheless limited by the fact that only fossil fuels or materials can be employed.

In addition, since the heat carrier is a gas formed in situ by a thermal reaction, the quantity of gas which must traverse the charge may exceed the permeability characteristics thereof and may introduce economic difficulties, especially when a closed circulation is desired through the furnace. This is a consequence of the fact that comparatively large volumes of carbon oxides are formed in the reaction and, in the event recirculation is desirable, e.g. as a heat conversing measure, the comparatively large quantities of carbon oxides can pose problems.

Finally, in connection with conventional techniques, it is important to note that they rely upon non-renewable energy sources and hence may be intolerable in locations in the world where renewable energy sources are available but fossil fuels are comparatively expensive or are of only limited availability. It should be noted that, in many cases, environmental concerns militate against the use of non-renewable energy sources when renewable energy sources are available.

OBJECTS OF THE INVENTION

It is, therefore, the principal object of the present invention to provide an improved method of melting ferriferous materials and, more particularly, to an improved method of melting scrap iron, sponge iron and pig iron, i.e. iron materials low in oxide content, whereby the requirements for nonrenewable energy sources are minimized.

Still another object of this invention is to provide a method of producing molten iron whereby energy is conserved and the versatility of the system is improved by comparison with earlier systems in particular in the ability to reduce the consumption of nonrenewable energy sources.

SUMMARY OF THE INVENTION

These objects and others which will become apparent hereinafter are attained, in accordance with the invention, in a method for the smelting of ferriferous material which comprises introducing the solid ferriferous material and only sufficient carbonaceous material for the carburization thereof into the upper part of a furnace in the lower part of which a melt of the iron can collect. According to the invention, moreover, a non-oxidizing gas is introduced into the furnace at a lower portion of the solid charge and rises through the latter, this non-oxidizing gas being heated to a high temperature and substantially a temperature of at least sufficient to melt the iron (a temperature above the melting point thereof) so that the thermal exchange of the sensible heat of the gas with the charge is sufficient to melt the ferriferous material.

Advantageously, the gas stream is heated to the high temperature by the application of electrical energy to this gas stream of a type and in an amount sufficient to transform the gas into a plasma so that the gas is introduced into the furnace in a plasma state.

Advantageously, the furnace is a cupola-type or upright furnace formed at the bottom thereof with a bosh in which the molten metal collects and from which the molten metal collects and from which the molten iron may be tapped, the bath of molten iron generally being surmounted by a layer of molten slag above which the solid charge is disposed. As the ferriferous material melts, the molten iron trickles through the solid charge and the slag into the bath therebelow. Advantageously, the gas is introduced into the furnace laterally, e.g. through tuyeres or injectors which can be individually equipped with plasma torches to heat the gas.

When references are made herein to a quantity of the carbonaceous material sufficient to carburize the ferriferous charge, I intend thereby to mean a quantity of the carbonaceous material which is sufficient to generate in the molten metal the desired carbon level and to eliminate by reaction to form carbon oxides, any oxide in the charge. Naturally, when the charge is selected from scrap iron, pig iron and sponge iron, this quantity of oxide is comparatively small.

When reference is made to a non-oxidizing gas, I naturally intend thereby to indicate that the quantity of oxygen or oxidizing agents in this gas is held as much as possible to a minimum. As a practical matter, it may not be possible to completely exclude oxygen. For example, when a substantially closed circulation of the gas is provided, traces of carbon oxides may be recirculated with the gas and if the gas is collected from the furnace by a hood or the like, traces of atmospheric oxygen may be entrained with the gas.

According to another feature of the invention, a neutral gas, such as nitrogen, is used which is recycled in the process of the invention. In this case, the gas above the charge is collected and recirculated, preferably after removal of carbon dioxide therefrom, the recirculated gas being injected through a plurality of tuyeres or injectors opening laterally at the base of the charge into the furnace. The injectors can be supplied by compressor, according to the invention and means can be provided for preheating the gas at the outlet of the compressor and, if desired, upstream of the plasma torch.

The preheating means can include a further plasma torch and, as already noted, a plasma torch may be provided at each injector or tuyere.

Naturally, when the system is operated in the closed circulation mode, means is provided above the charge for capturing the gases traversing same and evolved therein.

As will be apparent, one of the features of the invention is that it is able to replace a portion of the coke of the charge and/or of the auxiliary combustibles hitherto utilized to generate the thermal energy required by the charge by electricity and, preferably, electricity of nuclear origin which can be utilized at high levels in plasma torches. In order to accomplish this, the oxygen-containing gas hitherto required for blowing the charge in the furnace is replaced by a neutral gas, preferably nitrogen, which can be recycled through the furnace utilizing a closed circuit.

Naturally, if there are oxidizing constituents in the gas it is necessary to increase the quantity of coke by an amount such that the total quantity is slightly in excess of that necessary for the simple carburization of the melt and which corresponds to the stoichiometric quantity required to burn off this oxygen. Naturally, this supplemental quantity of coke may be replaced by a corresponding quantity of a hydrocarbon which can be injected into the gas flow to burn off any oxidizing components thereof.

In any event, the additional quantity of fuel or coke which is supplied and the quantity of oxidizing constituents in the gas should be minimized or held at zero to optimize the advantages of the present invention which allows replacement of the fossil energy by electrical energy from a renewable source.

BRIEF DESCRIPTION OF THE DRAWING

The above and other objects, features and advantages of the present invention will become more readily apparent from the following description, reference being made to the accompanying drawing in which the sole FIGURE is a diagrammatic vertical section and flow diagram of an apparatus for carrying out the method of the present invention.

SPECIFIC DESCRIPTION AND EXAMPLE

In the drawing, I have shown at 1 a cupola furnace which is provided with a closed circuit 2 for the blowing gas. The cupola 1 is provided with an upwardly open upper end 3 into which a solid charge 4 can be introduced.

A bath of the molten metal is found at 6 at the base of the furnace and is overlain by a slag layer 7, the solid charge of coke and low oxide ferriferous material being provided at 4 above the slag bath.

A tapping hole 8 is provided to enable the melt to be discharged from the furnace.

The blowing gas is introduced through tuyeres 5 and is perferably nitrogen heated to a temperature of about 2500° C. in individual plasma torches 9 provided for each tuyere and which may be preceded by a plasma torch 9' acting as a preheating unit. The electrical inputs to these plasma torches derive from a nuclear power plant 13.

The plasma torches are provided at the outlet or pressure side of a compressor 10 so that the gas entering the furnace is introduced into the latter in a plasma state.

The closed circulation path 2 comprises a hood 11 which can be removed to permit introduction of the charge and can be replaced above the furnace to capture the gases which rise from the solid charge therein. These gases are conducted via line 14 to the compressor, line 14 being provided with a trap 12 for eliminating carbon dioxide which is formed by combustion within the furnace of coke and trace oxides present in the ferriferous charge.

It should be obvious that the present invention does not materially alter the operation of the melting furnace for low oxide iron charges. The coke is charged with the ferriferous material, namely, the scrap or sponge iron, but only in a quantity just necessary for carburization of the melt, i.e. in an amount of about 50 to 60 kilograms per metric ton of the melt. The plasma torches generate the required heat which is carried to the charge by the neutral gas.

The following comparative table illustrates the prior art process and the present process:

|  | Classical Cupola | Plasma Cupola* |
|---|---|---|
| Consumption of coke in kg/t of melt | 150 | 55 |
| Electricity Consumption | — | 500 kWh |
| Flow of air in m$^3$(n)/ton of melt | 600 | — |
| Flow of N$_2$ in m$^3$(n)/ton of melt | — | 500 |

*Invention

These results reflect operation of the cupola without the addition of auxiliary combustibles at the tuyeres.

There is a coke saving of close to two thirds with the system of the invention with a consumption of electrical energy of about 500 kW hour per ton of the melt. The flow rates of the gas are essentially the same in the two cases or rather differ very little although it may be noted that the flow rate for the improved process is less, thereby reducing the energy required for displacement of this gas.

The plasma-operated cupola melting furnace of the invention can be used in place of the conventional cupola but also in place of other furnaces which have been used hitherto for smelting purposes, such as the blast furnace or an electric arc furnace.

The invention can be utilized in the production of modern steels and steel bodies for example, reinforcing rod of concrete in which the use of a blast furnace may not be justified economically and the melting of the scrap in an electric arc furnace may require considerable capital expenditure. Indeed, the system of the invention can be applied in many of the relatively small melting furnaces commonly found in most existing foundries.

The recirculation path is provided with means represented by a pipe 15 connected to a nitrogen tank 16 for adding make-up gas to the recirculation path.

I claim:

1. A method of making a ferrous metal which comprises the steps of:
   (a) forming a charge of a ferriferous material selected from the group which consists of iron scrap, pig iron and sponge iron, and a quantity of coke substantially just sufficient for the carburization of the melt;
   (b) electrically heating a substantially non-oxidizing gas to a temperature at least equal to the melting point of iron; and
   (c) passing said gas after the heating thereof through said charge in a shaft furnace to melt iron of said ferriferous material at a location spaced from that at which said gas is electrically heated and form a bath of molten iron below said charge, the ferriferous material being melted by the sensible heat carried by said gas.

2. The method defined in claim 1 wherein the gas is heated before it is introduced into said charge by electrically transforming it into a plasma state.

3. The method defined in claim 2 further comprising the step of collecting said gas after it traverses said charge and recycling said gas to said charge with heating of said gas in a plasma torch.

4. The method defined in claim 3, further comprising the step of purging carbon oxides from said furnace before recirculating gas thereto.

5. The method defined in claim 1 wherein said gas is nitrogen.

6. The method defined in claim 1 wherein said gas is introduced laterally into a cupola furnace receiving said charge through tuyeres.

7. The method defined in claim 6 wherein the gas is heated at each of tuyeres by a respective plasma torch.

8. The method defined in claim 7, further comprising the step of collecting gas from the top of said cupola furnace and recirculating said gas to said tuyeres and said plasma torches.

9. The method defined in claim 8 wherein said gas is compressed before it is introduced into said plasma torches.

* * * * *